US008650296B1

(12) United States Patent
Herington et al.

(10) Patent No.: US 8,650,296 B1
(45) Date of Patent: Feb. 11, 2014

(54) WORKLOAD REALLOCATION INVOLVING INTER-SERVER TRANSFER OF SOFTWARE LICENSE RIGHTS AND INTRA-SERVER TRANSFER OF HARDWARE RESOURCES

(75) Inventors: Daniel Edward Herington, Richardson, TX (US); William H. Blanding, Nashua, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1375 days.

(21) Appl. No.: 11/590,334

(22) Filed: Oct. 31, 2006

(51) Int. Cl.
*G06F 15/173* (2006.01)

(52) U.S. Cl.
USPC .......................................... 709/226

(58) Field of Classification Search
USPC ......................................... 709/215, 223–226
See application file for complete search history.

(56) References Cited

U.S. PATENT DOCUMENTS

| | | | |
|---|---|---|---|
| 5,754,763 A | 5/1998 | Bereiter | |
| 6,816,882 B1 * | 11/2004 | Conner et al. | 709/203 |
| 6,959,291 B1 * | 10/2005 | Armstrong et al. | 705/59 |
| 7,043,524 B2 | 5/2006 | Shah et al. | |
| 7,062,567 B2 | 6/2006 | Benitez et al. | |
| 7,096,469 B1 * | 8/2006 | Kubala et al. | 718/100 |
| 7,797,756 B2 * | 9/2010 | Herington | 726/31 |
| 8,082,547 B1 * | 12/2011 | Herington et al. | 718/104 |
| 8,141,096 B1 * | 3/2012 | Tormasov et al. | 718/104 |
| 2002/0184484 A1 * | 12/2002 | Abboud et al. | 713/100 |
| 2003/0051021 A1 * | 3/2003 | Hirschfeld et al. | 709/223 |
| 2003/0120778 A1 * | 6/2003 | Chaboud et al. | 709/225 |
| 2003/0177387 A1 * | 9/2003 | Osterwalder et al. | 713/201 |
| 2005/0044228 A1 * | 2/2005 | Birkestrand et al. | 709/226 |
| 2006/0085350 A1 * | 4/2006 | Samayamantry et al. | 705/59 |
| 2006/0190482 A1 * | 8/2006 | Kishan et al. | 707/103 Y |
| 2007/0245423 A1 * | 10/2007 | Herington | 726/31 |
| 2007/0265966 A1 * | 11/2007 | Kahn et al. | 705/51 |
| 2009/0043877 A1 * | 2/2009 | Grimm et al. | 709/223 |

* cited by examiner

*Primary Examiner* — Joshua Joo

(57) ABSTRACT

The present invention provides for intra-server transfer of hardware resources involving inter-server transfers of software license rights.

9 Claims, 1 Drawing Sheet

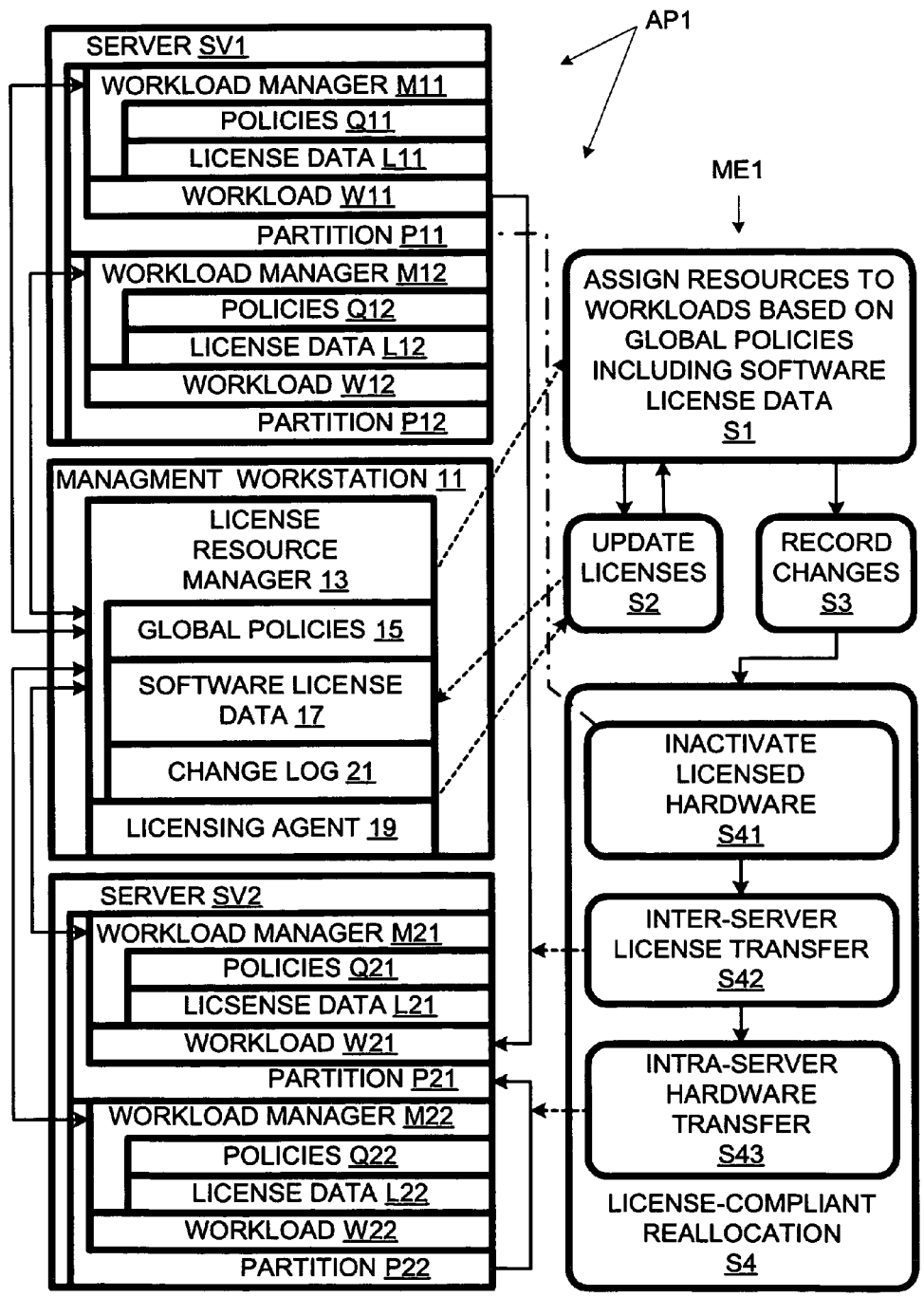

US 8,650,296 B1

WORKLOAD REALLOCATION INVOLVING INTER-SERVER TRANSFER OF SOFTWARE LICENSE RIGHTS AND INTRA-SERVER TRANSFER OF HARDWARE RESOURCES

BACKGROUND OF THE INVENTION

Herein, related art may be discussed to put the invention in context. Related art labeled "prior art" is admitted prior art; related art not labeled "prior art" is not admitted prior art.

Servers, e.g., web servers, database servers, are computers that provide services to other computers. Some servers can be partitioned to run multiple software workloads. License fees for server software are often based on the hardware resources available to run the software. Thus, the fees for running software restricted to an 8-CPU partition of a 32-CPU server can be much less than the fees for software permitted to run on the full system.

While early partitioning technology required manual intervention to change a partition's hardware resources, virtualization and other technologies provide for software-controlled reallocation of hardware resources between partitions of a server. This means that restricting software to a partition does not restrict it to a fixed amount of resources. Accordingly, software licenses may have to provide for the maximum number of resources that can be allocated to a partition, which can lead to wasteful over-provisioning on the licensee's part. As is apparent from the detailed description below with reference to the following drawing, the present invention addresses the problem of license over-provisioning in servers that allow software-controlled reallocation of resources to partitions.

BRIEF DESCRIPTION OF THE DRAWING

The following drawing is of embodiments of the invention and not of the invention itself.

FIG. 1 is a combination schematic illustration and flow chart of a server and associated method in accordance with embodiments of the invention.

DETAILED DESCRIPTION

The present invention provides a server workload management function that provides for software-controlled reallocation of hardware resources to workloads involving inter-server transfers of software license rights and intra-server transfers of hardware resources. Thus, while software-controlled hardware resource transfer must occur within a partitioned server, any necessary license rights required for the transfer can be obtained from any server in a centrally managed network of servers.

A data center AP1 includes plural servers, including servers SV1 and SV2, and a management workstation 11. Server SV1 is divided into two partitions P11 and P12, each with its own workload W11, W12, workload manager M11, M12, and management policies Q11, Q12. Likewise, server SV2 is divided into two partitions P21 and P22, each with its own workload W21, W22, workload manager M21, M22, management policies Q21, Q22, license data L11-L22. In alternative embodiments, there are more servers. Each server can have any number of partitions, and the servers need not be partitioned in the same way. In an alternative embodiment, the functions of management workstation 11 can be implemented by one of the servers.

Workload managers M11-M22 monitor conditions of their respective partitions and workloads. Workload managers M11-M22 can request additional resources when conditions (e.g., over utilization of CPU resources) warrant. Also, workload managers M11-M22 can "offer" idle resources for use by non-respective workloads. For example, if workload W11 is not utilizing all the CPUs allocated to it, workload manager M11 can offer a CPU for use by workload W12. If the offer matches a request from workload manager M12, the CPU is transferred provided the license for workload W12 allows the additional CPU, or more generally, the additional resource. However, a workload manager will not request additional resources if the respective license data 17 indicates that the respective workload is not licensed to use the additional resources.

Each workload W11-W22 includes an operating system and one or more applications, such as a database, accounting, or web server application. In most cases, each operating system and each application will be subject to license terms, although in some cases, one license may cover multiple instances of a software program. Some licenses may specify hardware resource limits on a per-instance basis, while others may allow pooling of rights between instances. For example, a license might provide for up to two instances of an application that runs on a total of eight CPUs, however divided between the instances. In addition, some licenses can provide for automated modification, e.g., automated ordering and payment for additional license rights.

Data center AP1 can employ the following method ME1 in accordance with an embodiment of the invention. Method ME1 can be initiated in several ways: there can be a scheduled reallocation, or one triggered by a user, or one triggered in response to some condition, such as an overutilization. For example, workload manager M11 can detect overutilization of resources of partition P11 and inform workload manager M12 and license resource manager 13 of the overutilization.

At method segment S1, resources are assigned (or reassigned) to workloads based on hardware and software-license resource policies. In this case, hardware resources can be shifted between partitions of a server, but not between servers. Accordingly, the only way to add resources to partition P21 is to remove them from partition P22. If policies Q21 and Q22 permit resources to be transferred to partition P21, the reallocation can take place. If the policies give partition P22 a higher priority for its resources, the transfer does not take place.

In a third case, the required hardware resources can be spared by partition P11, but license data L21 may preclude the transfer. In this case, the reallocation request is forwarded to license resource manager 13. In this case, license resource manager 13 can try to determine if licenses required for the transfer can be obtained from another server, e.g., server SV1.

License rights can be transferred between servers, for example, when both servers are running instances of a program for which resource rights can be pooled. For example, workloads W11 and W21 could be two instances of the same database program; if the license rights for the two instances are poolable, then resource rights from the instance associated with workload W11 can be transferred to the instance associated with workload W21. Assuming workload W11 is underutilizing its resource rights, some rights can be transferred to workload W21.

License rights can be transferred if the license for workload W11 is for more resources than are currently available to workload W11. Alternatively, even if all resources are available to workload W11, they may not be used, or they may be used but not required (e.g., workload W11 may be a low-priority workload). In that case, then some or all resources available to workload W11 can be inactivated and left idle, or inactivated and transferred to workload W21. Then, the freed license rights can be transferred to workload W11. Then the required hardware resources can be transferred from workload W12 to workload W11.

If sufficient license rights are not available to be transferred from other workloads to workload W21, license resource manager 13 can, if global policies 15 dictate, obtain additional license rights by calling licensing agent 19 at method segment S2. Licensing agent 19 is programmed to interact with a software vendor to effect automatic modifications of license rights. This approach can also be used where license rights are available but obtaining additional rights is a more optimal solution, as determined by global policies 15.

Once a reallocation is planned, it is recorded at method segment S3 to a change log 21. The recorded data can be used for accounting and chargebacks, e.g., as the reallocation shifts resources budgeted by one company department to a workload belonging to a different department. In addition, recorded license chronology can be used for future license planning.

Once sufficient license rights have been found or obtained, they can be transferred between servers at method segment S4. The transfer should be license compliant. For example, it might not be compliant to transfer resources first and then license rights since there would be a short time during which data center AP1 would be out of compliance with a software license.

Accordingly, the transfer can begin at method segment S41 by inactivating licensed hardware on partition P11 if necessary to avoid violating licensing restrictions when rights are removed from workload W11. Then, license rights are transferred from partition P11 to partition P21 at method segment S42. This is an inter-server license rights transfer. Once workload W21 has the required license rights, hardware resources can be transferred intra-server from partition P22 to partition P21, at method segment S43, completing the desired reallocation of resources.

In general, workload management software manages resources within individual servers by moving resources between partitions on the server and could be enhanced to manage software licenses in the same way. However, this would still mean that a customer might have to purchase more total licenses than necessary in order to insure that no individual server will be out of compliance. Licenses are not necessarily restricted to use on a single server, but may be applicable across many servers in a data center. In order to use software licenses most efficiently, the present invention provides for managing them across multiple servers.

This invention addresses the issue of managing software licenses across multiple servers in a data center, where each server operates under the control of a workload manager. Each server workload manager manages the resources in the partitions on its server and tracks the kind and number of software licenses available to each partition and the kind and number desired by each partition as a result of planned resource management actions. When a need for a change [increase or decrease] in licenses arises from resource management, the workload manager passes a request for this change to the license resource manager.

The license resource manager manages a shared pool of software licenses for each application and allocates the licenses to the partitions in all of the individual servers that form a part of its management domain. The allocation is performed by applying license policies, which can be specified by the customer to the requests from all of the servers. The results of this allocation are then sent to the individual workload managers, which can now perform their resource management under altered software license constraints.

This overall operation has the effect of assigning the software licenses to the activities that need them most in accordance with the resource management policies applied to the workload managers by the customer and the resource license management rules applied to the license manager by the customer. The net result is that software license expense can be minimized across the entire data center and that available software licenses are applied in accordance with the customer's business priorities to the demands generated across the data center.

The invention allows the customer to purchase software licenses to satisfy peak demand across the entire data center instead of for the sum of peak demands of individual servers. This is likely to result in a lower total license requirement, since individual peak demands may not coincide. The invention allows the customer to control use of software licenses in accordance with business commitments—e.g. if a particular line of business contracts for a certain number of licenses, the license management allocation rules can be configured to insure that the applications belonging to that line of business receive the contracted licenses.

Available software licenses are applied in accordance with the customer's business priorities dynamically to the workload demands generated across the data center. In addition, the invention can provide for historical information on demand for software licenses, which enables license capacity planning. Moreover, the invention provides for information on use of software licenses, which enables accounting and chargebacks.

While the foregoing description has emphasized inter-server transfer of software license rights, in practice, most systems providing for such transfers would also provide for intra-server transfers of software license rights. These could be from a partition from which hardware resources are to be transferred, or from another partition.

While FIG. 1 shows two servers with two partitions each, the invention provides for greater numbers of servers, each of which can have one or any number more partitions. The partitions can be hard or virtual. The policies can involve utilization levels, usage predictions, and business priorities, among other considerations. The policies can seek to evenly distribute workloads or concentrate them so that some resources can be powered down. The license terms can vary and provide various means for augmenting a license to permit a reallocation, including automatic payment for an additional resource. The resources can be CPUs, memory, I/O devices, and various combinations and types of those classes of computer components. Now that multi-core processors are becoming prevalent, licensing and resource transfers can be on a per-core rather than a per-CPU basis. Fractional resource transfers can also be implemented, e.g., by time-sharing a resource such as a CPU or core. These and other variations upon and modifications to the illustrated embodiment are provided for by the present invention, the scope of which is defined by the following claims.

What is claimed is:

1. A computer-implemented method of managing a centrally managed system of servers, said method comprising:
while a target workload is running in a target partition of a target hardware server using a first amount of hardware resources, assigning a second amount of hardware resources to said target partition in excess of a licensed amount of said hardware resources on which said first workload is licensed to run under a software license associated with said first workload, said target workload including an operating system or an application;

increasing said licensed amount to at or above said second amount at least in part by using an inter-server transfer of software license rights from a source workload running on a source hardware server to said target workload; and allocating said second amount of said hardware resources to said target partition at least in part by using an intra-server transfer of said hardware resources from a source partition of said target hardware server to said target partition.

2. A method as recited in claim 1 further comprising updating software licenses before increasing said second amount.

3. A method as recited in claim 1 further comprising inactivating hardware on said source hardware server before transferring software licenses to said target workload.

4. A method as recited in claim 1 further comprising recording configuration changes due to said transfers of said software license rights and said hardware resources.

5. A computer system comprising:

a first hardware server having first and second partitions and a first workload running on said first partition, said first workload including an operating system or an application;

a second hardware server running a second workload;

management hardware storing workload allocation policies and software license data and running a workload manager, said workload manager being configured to while said first workload is executing in said first partition using a first amount of hardware resources, assign a second amount of hardware resources to said first partition, said second amount exceeding a licensed amount of said hardware resources on which said first workload is licensed to run under a software license associated with said first workload, increase said licensed amount to at or above said second amount using an inter-server transfer of software license rights from said second workload to said first workload, and allocating said second amount of said hardware resources to said first partition at least in part by using an intra-server transfer of said hardware resources from said second partition to said first partition.

6. A computer system as recited in claim 5 further comprising a licensing agent for automatically modifying software licenses prior to said inter-server transfer of software license rights.

7. A computer system as recited in claim 5 further including a log of configuration changes involving transfers of software license rights.

8. A computer product comprising non-transitory media encoded with code configured to, when executed by a processor:

while a target workload is running in a target partition of a target server using a first amount of hardware resources, assign a second amount of hardware resources to said target partition in excess of a licensed amount of said hardware resources on which said first workload is licensed to run under a software license associated with said first workload, said target workload including an operating system or an application;

increase said licensed amount to at or above said second amount at least in part by using an inter-server transfer of software license rights from a source workload running on a source server to said target workload; and allocate said second amount of said hardware resources to said target partition at least in part by using an intra-server transfer of said hardware resources from a source partition of said target server to said target partition.

9. A computer product as recited in claim 8 further comprising said processor.

* * * * *